W. C. FREELAND.
MEANS FOR STEERING AUTOMOBILE HEADLIGHTS.
APPLICATION FILED MAR. 29, 1915.
1,167,686.
Patented Jan. 11, 1916.
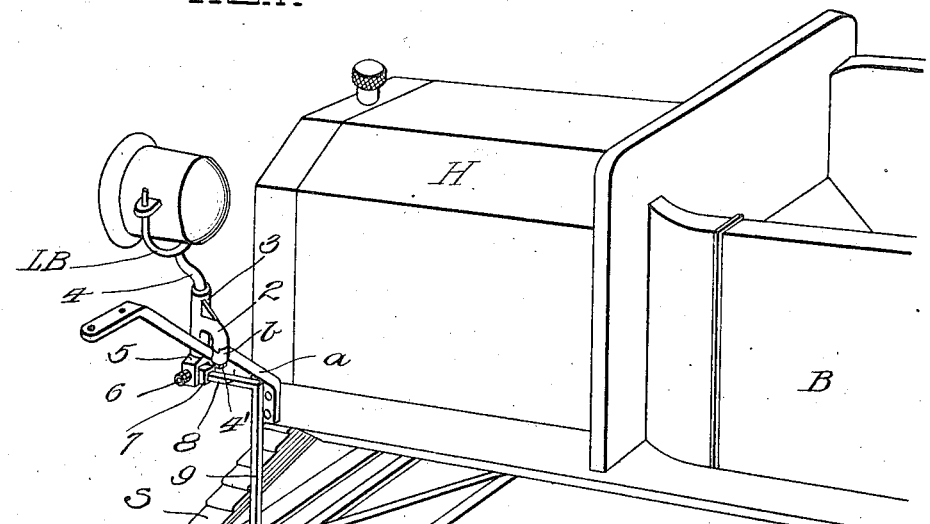
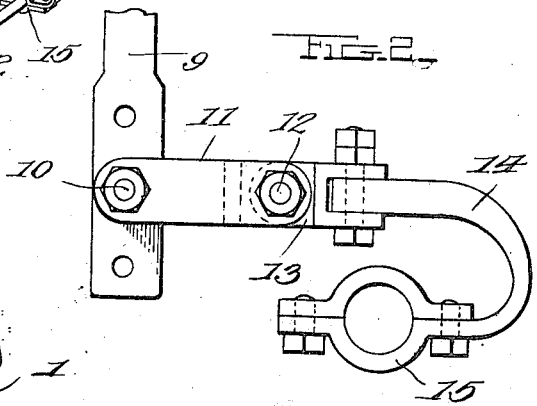
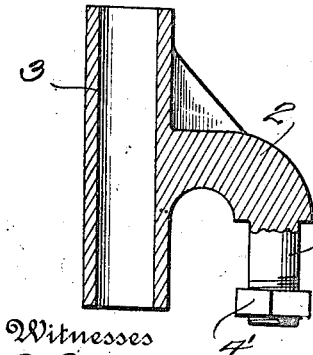
Inventor
William C. Freeland.
Witnesses
by
Attorneys

UNITED STATES PATENT OFFICE.

WILLIAM C. FREELAND, OF LOMAX, ILLINOIS.

MEANS FOR STEERING AUTOMOBILE-HEADLIGHTS.

1,167,686.      Specification of Letters Patent.      Patented Jan. 11, 1916.

Application filed March 29, 1915. Serial No. 17,818.

*To all whom it may concern:*

Be it known that I, WILLIAM C. FREELAND, a citizen of the United States, residing at Lomax, in the county of Henderson and State of Illinois, have invented certain new and useful Improvements in Means for Steering Automobile-Headlights; and I do declare the following to be a full, clear, and exact description of the invention such as will enable others skilled in the art to which it appertains to make and use the same.

My invention relates broadly to improvements in automobile accessories and more particularly to devices for steering the headlights of automobiles, simultaneously with the steering of the front wheels thereof.

The object of the invention is to provide means of this class so constructed as to allow its attachment to practically any type of automobile, yet to construct the device in the most simple manner possible.

With this general object in view, the invention resides in certain novel features of construction and combination hereinafter described and particularly pointed out in the claim.

In describing the invention, I shall refer to the accompanying drawing wherein like reference characters designate corresponding parts throughout the various views and wherein:

Figure 1 is a perspective view of a portion of an automobile showing the application of the invention thereto; Fig. 2 is a side view of the clamp to be described and the flexible arm connected to the same; and Fig. 3 is a sectional view showing more particularly the construction and type of bearing in which the lamp bracket is rotatably mounted.

In this drawing constituting a part of the application, a portion of an automobile is shown including the usual body B, hood H, front axle A, steering arms $S^a$ connected to the spindles at the opposite ends of the axles, and springs S supporting the body of the machine above the axle thereof.

The automobile so far briefly described likewise includes an arm $a$ which inclines upwardly and laterally from a point adjacent the radiator, the latter being disposed immediately in advance of the hood H as is common with devices of this class. The arm $a$ is usually employed for the support of one of the front fenders of the machine, and in the Ford car (the type represented in the drawing), said arm is provided with an upright bearing $b$ between its ends, said bearing being provided for the support of a lamp bracket LB, the latter usually having a bolt or the like whereby it is rigidly secured to said bearing. In the present invention, however, the bearing $b$ receives an upright bolt 1 which is formed on an elbow or the like 2 projecting horizontally from an upright tubular bearing 3, a nut 4' being threaded on the aforesaid bolt 1 whereby to prevent relative movement of the bearings $b$ and 3. It is within the bearing 3, that the upright shaft 4 of the lamp bracket LB is rotatably mounted, this shaft being substituted for the usual bolt above mentioned.

In the present embodiment of the invention, the shaft 4 is shown as extended slightly below the bearing 3 and as provided at this point with a fork 5 affixed thereto by a set screw or the like. Disposed within the fork 5 and pivotally connected thereto by a horizontally disposed transversely extending pivotal axis 6, is a head 7 formed on one end of a horizontal longitudinally extending crank arm 8. Depending from the other end of the crank arm 8 and shown in the present embodiment as formed integrally therewith, is an upright rod 9 whose lower end is provided with a plurality of vertically spaced openings, said end being shown in the drawings as disposed between the axle A and the steering rod R, the latter being pivotally connected to the steering arms $S^a$ in any well known manner. The aforesaid lower end of the rod 9 is pivoted by a horizontally disposed bolt or the like 10 to the forward end of a link 11 whose rear end is pivoted by an additional horizontal bolt 12 or other preferred type of pivotal axis, to the front end of an additional link 13, the rear end of the latter being provided with a fork whose arms are vertically spaced and which receive therebetween the front end of a curved arm 14 which is carried by a clamp 15 secured to the steering rod R. The front end of said arm 14 is pivoted to the fork 13 by the provision of any preferred type of upright pivotal axis, such for instance as the bolt shown in the drawings.

By constructing the parts in the manner above described, it will be seen that lateral shifting of the steering rod R to steer the machine, will, through the instrumentality of the links 11 and 13 (constituting a flexible arm) shift the rod 9 laterally, thereby so moving the crank arm 8 as to rotate the lamp bracket LB in the direction which the front wheels have been moved. Needless to say, this movement of the lamp bracket likewise causes the lamp L carried thereby to direct its rays immediately in the direction in which the machine is being turned.

It is to be observed that the arm 14 is of such proportions as to yield in case the body of the machine be forced suddenly downward in respect to the axle thereof. This is desirable, since although the vertically movable link 11 allows sufficient movement to compensate for the expansion and contraction of the springs, under normal conditions, it might not be ample to compensate for excessive compression of said springs. Under such conditions, were it not for the provision of the yieldable arm 14, the steering rod R would probably be bent. It will be understood, however, that construction other than that above described and shown in the drawings may well be employed for connecting the rod 9 and the steering rod R, these features being unimportant provided they allow sufficient relative movement of the various parts of the device.

From the foregoing description, taken in connection with the accompanying drawing, it will be evident that extremely simple construction has been provided for carrying out the object of the invention, yet such construction will be highly efficient in operation and will possess a number of advantageous features. Particular emphasis is laid upon the provision of the crank arm 8, pivoted to the lamp bracket upon a horizontal axis, upon the parts connecting said crank arm with the steering rod, and likewise upon the specific construction of the bearing 3 and attaching means therefor, this last named construction being very desirable on account of the fact that it may be readily attached not only to machines of the Ford type, but to a number of other makes of automobiles.

In the foregoing description, I have described certain specific details for accomplishing probably the best results, and in the drawings have shown such details as applied to the Ford machine. It will be evident, however, that I need not be limited to the application of the invention to any particular type of automobile, or to any details of construction otherwise than as set forth in the following which I claim as my invention.

I claim:

The combination with an automobile and a laterally swinging lamp bracket carried thereby, of a substantially horizontal crank arm pivoted to said bracket upon a horizontal axis, a rod depending from said crank arm, a link with forked opposite ends connected at one end with the lower end of said rod, an additional link pivoted to the free end of said first mentioned link upon a horizontal axis, and a substantially U-shaped arm rigidly secured at one end to the steering rod of the automobile and pivotally engaged at the other to the additional link upon a vertical axis.

In testimony whereof I have hereunto set my hand in presence of two subscribing witnesses.

WILLIAM C. FREELAND.

Witnesses:
GEORGE W. HOPPER,
JAMES R. FRENCH.